United States Patent
Barbarossa

(10) Patent No.: US 7,894,722 B2
(45) Date of Patent: Feb. 22, 2011

(54) PACKAGED OPTICAL DEVICE STACK

(75) Inventor: Giovanni Barbarossa, Saratoga, CA (US)

(73) Assignee: Oclaro (North America), Inc., San Jose, CA (US)

( * ) Notice: Subject to any disclaimer, the term of this patent is extended or adjusted under 35 U.S.C. 154(b) by 784 days.

(21) Appl. No.: 11/742,999

(22) Filed: May 1, 2007

(65) Prior Publication Data

US 2008/0273834 A1    Nov. 6, 2008

(51) Int. Cl.
*H04J 14/00* (2006.01)
(52) U.S. Cl. ................... 398/45; 398/46; 398/48
(58) Field of Classification Search ........... 398/45–46, 398/48, 82–88
See application file for complete search history.

(56) References Cited

U.S. PATENT DOCUMENTS

| | | | |
|---|---|---|---|
| 2005/0036202 A1* | 2/2005 | Cohen et al. | 359/495 |
| 2007/0140618 A1* | 6/2007 | Doerr et al. | 385/37 |
| 2008/0181559 A1* | 7/2008 | Corem et al. | 385/18 |

* cited by examiner

*Primary Examiner*—Dzung D Tran
(74) *Attorney, Agent, or Firm*—Patterson & Sheridan, L.L.P.

(57) ABSTRACT

A packaged stack of optical devices includes two or more WDM optical devices, the stack having a reduced per-channel manufacturing cost and an improved mean time between failure relative to individual optical devices. WDM optical devices, which may be contained in a packaged stack, include wavelength selective switches, optical add-drop multiplexers, and dynamic gain equalizers. The optical switching devices in the stack may be configured so that one or more optical elements are shared by multiple switching devices. Optical components that may be shared between the switching devices contained in the stack include cylindrical lenses, diffraction gratings, mirrors, and beam steering units.

19 Claims, 4 Drawing Sheets

PACKAGED OPTICAL DEVICE STACK

BACKGROUND OF THE INVENTION

1. Field of the Invention

Embodiments of the present invention relate generally to optical communication systems and components and, more particularly, to a packaged stack of optical devices.

2. Description of the Related Art

In a wavelength division multiplexing (WDM) optical communication system, information is carried by multiple channels, each channel corresponding to a unique wavelength. WDM allows transmission of data from different sources over the same fiber optic link simultaneously, since each data source is assigned a dedicated channel. The result is an optical communication link with an aggregate bandwidth that increases with the number of wavelengths, or channels, incorporated into the WDM signal. In this way, WDM technology maximizes the use of an available fiber optic infrastructure; what would normally require multiple optic links or fibers instead requires only one.

In WDM optical communication systems, it is often necessary to add, drop, and/or attenuate a light beam. This can be achieved by an optical switching device, which directs an input light beam to one of multiple output optical paths. For example, in a 1×2 optical switching device, an input light beam enters through an input fiber and is directed to one of two output fibers. There are also more complicated optical switching devices, such as 2×2, 1×N, and N by N switching devices, which are sometimes realized by combining several 1×2 devices. In some optical networks, the individual wavelength channels of a WDM input signal are directed to different output fibers by an optical switching device, such as a wavelength selective switch (WSS) or an optical add-drop multiplexer (OADM). In addition, individual wavelength channels of a WDM input signal may be attenuated by an optical switching device, such as a dynamic gain equalizer (DGE).

The optical switching devices for WDM communication systems, such as WSSs, OADMs, and DGEs, are quite complex, and include active and passive optical elements that must be manufactured and aligned to high tolerances for proper operation of such switching devices. Because of this, the manufacturing costs for assembly, testing and quality assurance of WDM optical switching devices are substantial. As bandwidth requirements for optical communication networks increase, it is desirable to reduce per-channel manufacturing costs and improve per-channel mean time between failure (MTBF) of WDM optical switching devices.

Accordingly, there is a need for optical switching devices used in communications networks, e.g., WSSs, OADMs, and DGEs, for which the per-channel cost is reduced and MTBF is improved without adversely affecting network bandwidth.

SUMMARY OF THE INVENTION

Embodiments of the present invention provide a packaged stack of optical devices that includes two or more WDM optical devices, the stack having a reduced per-channel manufacturing cost and an improved mean time between failure relative to individual optical devices.

In one embodiment, a packaged optical device stack comprises a first WDM optical device, a second WDM optical device, and a common housing for the first and second optical devices. Light beams transmitted through the first WDM optical device travel along a first set of optical paths and light beams transmitted through the second WDM optical device travel along a second set of optical paths, and the optical paths in the first set do not intersect the optical paths in the second set. The first and second WDM optical devices may share one or more optical elements, including a diffraction grating and/ or a beam polarization unit.

In another embodiment, a packaged optical device stack comprises a first WDM optical device having N input ports and M output ports, a second WDM optical device having N input ports and M output ports, and a common housing for the first and second WDM optical devices, wherein the first WDM optical device and the second WDM optical device share one or more optical elements, and wherein N is any positive integer and M is any positive integer greater than or equal to 2. The shared optical element may include a diffraction grating and/or a beam polarization unit.

In yet another embodiment, a wavelength selective switch comprises a first set of input and output ports, a second set of input and output ports, and a light dispersing element for dispersing a first input light beam received through the first set of input and output ports into a first set of multiple wavelength components and a second input light beam received through the second set of input and output ports into a second set of multiple wavelength components. The wavelength selective switch further comprises a first optical switch for receiving the first set of multiple wavelength components and directing them to one of multiple directions and a second optical switch for receiving the second set of multiple wavelength components and directing them to one of multiple directions. The light dispersing element may be configured to receive the first set of multiple wavelength components that passed through the optical switch and combine them into a single output light beam and to receive the second set of multiple wavelength components that passed through the optical switch and combine them into a single output light beam.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numerals have been used, where applicable, to designate identical elements that are common between figures. It is contemplated that features of one embodiment may be incorporated in other embodiments without further recitation.

DETAILED DESCRIPTION

Embodiments of the present invention provide a packaged stack of two or more WDM optical switching devices having a reduced per-channel manufacturing cost and an improved MTBF over individual optical switching devices. The packaged stack is particularly advantageous when the switching devices are configured so that one or more optical elements are shared by the switching devices contained in the packaged stack.

Figure 1A:
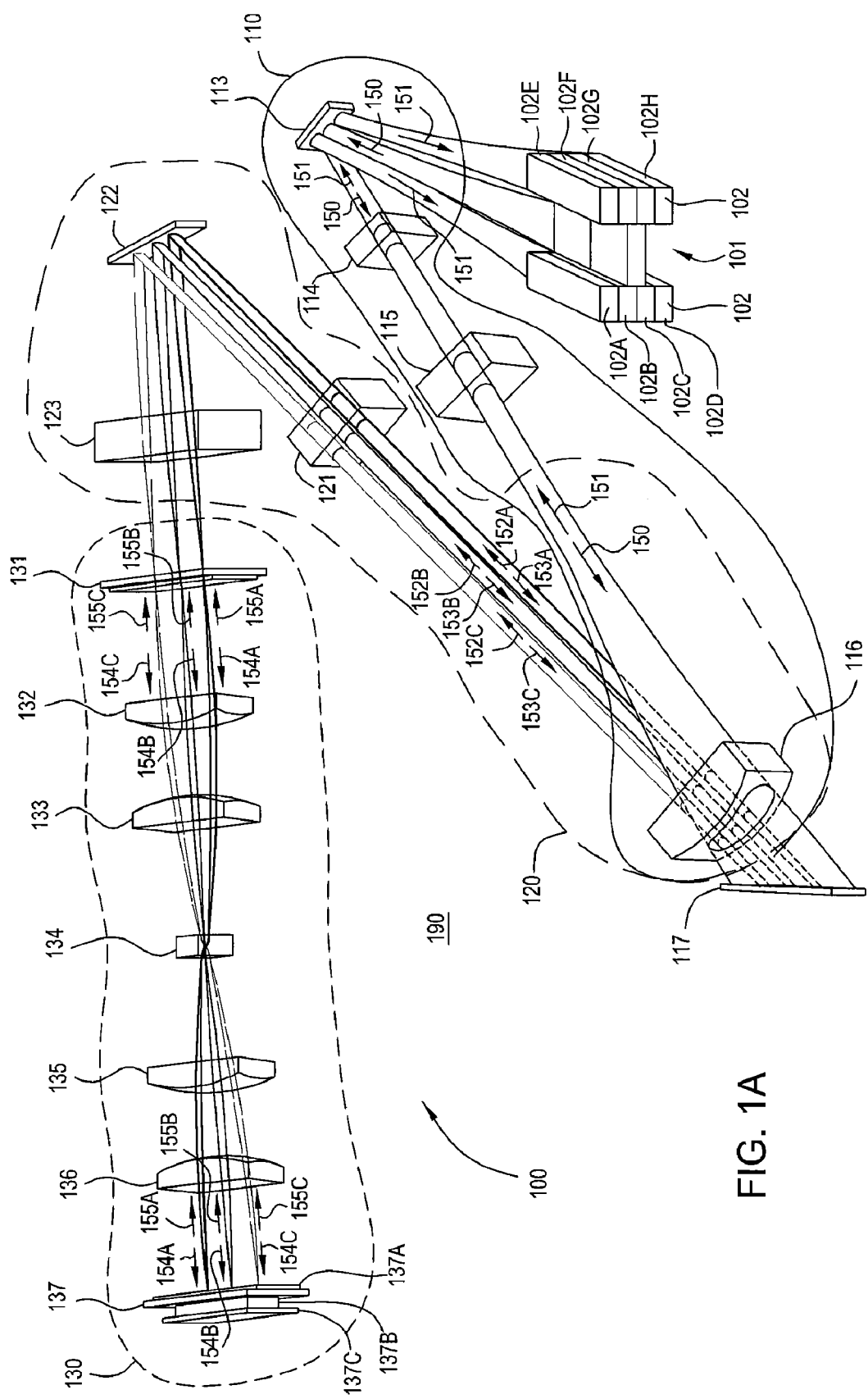
FIG. 1A is a perspective view of a WSS that may be expanded to form a packaged stack of multiple switching devices according to an embodiment of the invention.

FIG. 1A is a perspective view of a WSS that may be expanded to form a packaged stack of multiple switching devices according to an embodiment of the invention. WSS 100 is a 1×4 WSS and includes an optical input port 101, an optical output port stack 102, a first beam shaping/steering section 110, a diffraction grating 117, a second beam shaping/steering section 120, and a switching optics assembly 130. The components of WSS 100 are mounted on a planar surface 190 that is herein defined as the horizontal plane for purposes of description. In the example described herein, planar surface 190 is substantially parallel to the plane traveled by light beams interacting with WSS 100. Also for purposes of description, the configuration of WSS 100 described herein performs wavelength separation of a WDM signal in the horizontal plane and switching selection, i.e., channel routing, in the vertical plane. A WSS configured to perform switching selection in the horizontal plane and wavelength separation in the vertical plane may also be expanded to form a packaged stack of multiple switching devices.

As described below in conjunction with FIG. 2B, WSS 100 is scalable in the vertical plane, i.e., in the plane perpendicular to the plane traveled by light beams interacting with WSS 100, and therefore may be expanded to include 2 or more stacked WSS's packaged together as a single stack. For example, WSS 100, which is a 1×4 WDM wavelength selective switch, may be expanded to an optical switch stack of two or more WSS's with minimal additional cost. One example of such an optical switch stack is a double-deck WSS 200, described below in conjunction with FIG. 2B. In this way, the optical switch stack serves as a 2×8 WDM switch, a 3×12 WDM switch, etc., depending on how many WSS "levels" WSS 100 has. For clarity, the operation and organization of WSS 100, i.e., a single, unexpanded WDM optical switching device, is first described in conjunction with FIGS. 1A and 1B.

For illustrative purposes, inbound light beams 150, 152A-C, 154A-C, and outbound light beams 151, 153A-C, 155A-C are shown in FIG. 1A to more clearly indicate the optical coupling of various elements of WSS 100. Because of the bi-directional nature of most components of WSS 100, light beams are directed along parallel inbound and outbound paths simultaneously between optical components of WSS 100. The inbound and outbound paths are displaced from each other vertically, and this vertical displacement is further described below. For clarity, a single light beam is used in FIG. 1A to schematically represent both an inbound and outbound light beam between two optical components of WSS 100 rather than two beams that are vertically displaced with respect to one another. For example, inbound light beam 150 and outbound light beam 151 are schematically represented by a single light beam between folding mirror 113 and diffraction grating 117.

Optical input port 101 optically couples a WDM optical input signal (not shown) to WSS 100. Optical output port stack 102 is, in the configuration shown in FIG. 1A, positioned proximate input port 101. Optical output port stack 102 includes four vertically aligned optical output ports 102A-D and four vertically aligned loss ports 102E-H. Optical output ports 102A-D act as the optical output interface between WSS 100 and other components of a WDM optical communication system. Loss ports 102E-H serve as termini for light beams consisting of unwanted optical energy, for example wavelength channels blocked from a WDM output signal.

First beam shaping/steering section 110 includes a folding mirror 113, beam steering unit 114, and cylindrical lenses 115 and 116. First beam shaping/steering section 110 optically couples diffraction grating 117 with optical input port 101 and optical output port stack 102, and shapes inbound beam 150 and outbound beam 151. First beam shaping/steering section 110 is also configured to direct outbound beam 151 to either a loss port or an optical output port contained in optical output port stack 102, depending on the polarization state of outbound beams 153A-C. Inbound beam 150 and outbound beam 151 may each contain a plurality of wavelength channels that are multiplexed into a single, "white" beam. Beam steering unit 114 is configured to direct outbound beam 151 along two different optical paths depending on the polarization state of outbound beam 151. The two paths may be separated in the horizontal plane by an angular or translational offset. Beam steering unit 114 may be a Wollaston prism, which angularly deflects light beams at different angles depending on their orthogonal polarization states, or a birefringent crystal, such as a YV04 crystal, which translationally deflects the light beams by different amounts depending on their orthogonal polarization states. Beam steering unit 114 has a vertical axis of symmetry.

Cylindrical lens 115 vertically extends inbound beam 250, and cylindrical lens 216, which has a vertical axis of symmetry, horizontally extends inbound beam 150. Together, cylindrical lenses 115, 116 shape inbound beam 150 so that the beam is elliptical in cross-section when incident on diffraction grating 117, wherein the major axis of the ellipse is parallel with the horizontal plane.

Diffraction grating 117 is a vertically aligned reflective diffraction grating configured to spatially separate, or demultiplex, each wavelength channel of inbound beam 150 by directing each wavelength along a unique optical path. In so doing, diffraction grating 117 forms a plurality of inbound beams, wherein the number of inbound beams corresponds to the number of optical wavelength channels contained in inbound beam 150. In FIG. 1A, diffraction grating 117 is shown to separate inbound beam 150 into three inbound beams 152A-C. However, in practice, the number of optical channels contained in inbound beam 150 may be up to 50 or more. Because the separation of wavelength channels by diffraction grating 117 takes place horizontally in the configuration shown in FIG. 1A, spectral resolution is enhanced by widening inbound beam 150 in the horizontal plane, as performed by cylindrical lens 116. Diffraction grating 117 also performs wavelength combination, referred to as multiplexing, of outbound beams 153A-C into outbound beam 151.

Second beam shaping/steering section 120 includes a folding mirror 122, cylindrical lenses 116, 121, and a focusing lens 123. Second beam shaping/steering section 120 optically couples diffraction grating 117 with switching optics assembly 130, shapes inbound beams 152A-C and outbound beams 153A-C, and focuses inbound beams 152A-C on the first element of switching optics assembly 130, i.e., beam polarization unit 131. Focusing lens 123, like cylindrical lens 116, has a vertical axis of symmetry.

Switching optics assembly 130 includes an LC-based beam polarization unit 131, collimating lenses 132, 133, a beam steering unit 134, collimating lenses 135, 136, and an LC-based beam polarization and steering unit 137. The elements of switching optics assembly 130 are optically linked to enable the optical routing of a WDM optical input signal entering optical input port 101 to any one of the optical output ports 102A-D or loss ports 102E-H. The optical routing is performed by conditioning (via LC polarization) and vertically displacing inbound beams 152A-C to produce outbound beams 153A-C. Switching optics assembly 130 selectively determines the vertical displacement of outbound beams 153A-C to correspond to the vertical position of the desired output port, i.e., optical output port 102A, 102B, 102C, or 102D, hence performing a 1×4 optical switching operation. In addition, switching optics assembly 130 may selectively condition each of inbound beams 152A-C to allow independent attenuation or blocking thereof. Further, switching optics assembly 130 performs the 1×4 switching operation with a high extinction ratio. Lastly, switching optics assembly 130 allows switching of outbound beam 151 between optical output ports 102A-D to be "hitless," i.e., without the transmission of a signal to unwanted output ports.

Beam polarization unit 131 includes an LC switching array 160 (shown in FIG. 1B) and an array of transparent electrodes, which together are configured to condition the polarization of each of inbound beams 152A-C and produce inbound beams 154A-C. LC switching array 160 and the array of transparent electrodes are also configured to condition the polarization state of outbound beams 155A-C so that each beam, and therefore each wavelength channel of outbound beam 151, may be independently attenuated or directed to one of loss ports 102E-H. The electrodes are arranged vertically and horizontally to define individual LC pixels, the pixels being optically coupled to inbound or outbound beams as described below in conjunction with FIG. 1B.

Figure 1B:
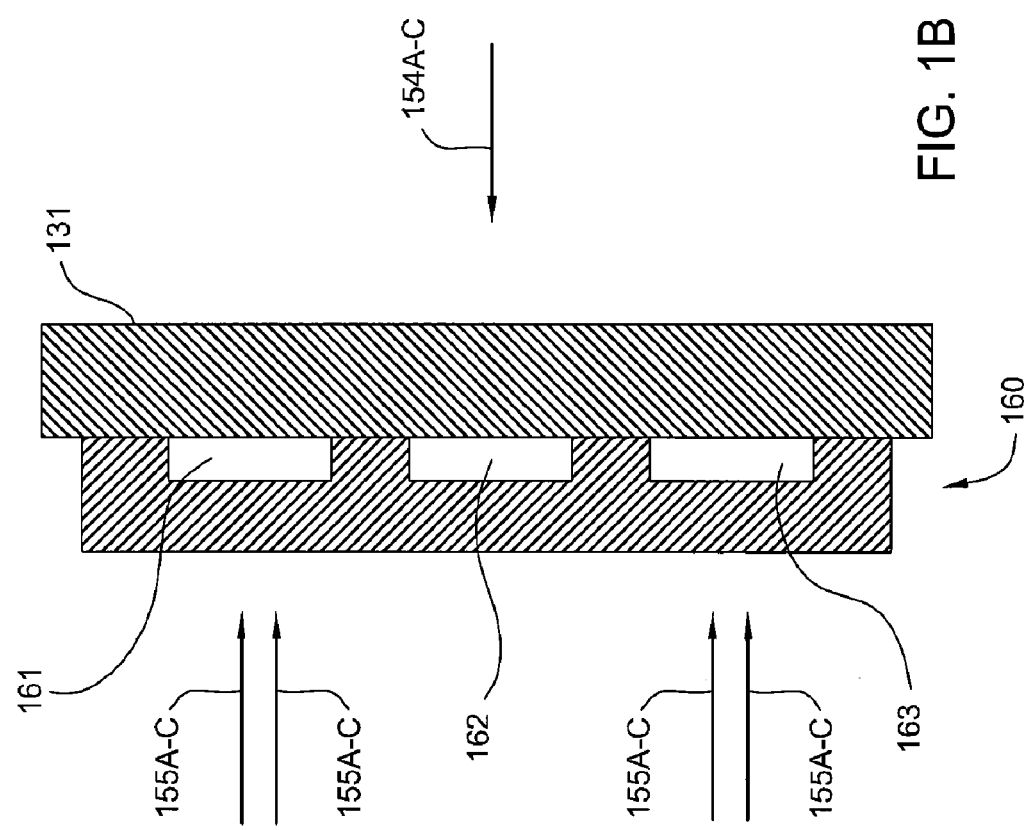
FIG. 1B illustrates a schematic side view of a beam polarization unit and inbound and outbound light beams.

FIG. 1B illustrates a schematic side view of beam polarization unit 131, inbound beams 154A-C, and outbound beams 155A-C. Switching stack 160 includes three horizontal arrays 161-163 of LCs. Each horizontal array 161-163 contains a plurality of LC pixels, one corresponding to each wavelength channel demultiplexed from inbound beam 150 by diffraction grating 117. Each of inbound beams 155A-C are directed through a corresponding LC of horizontal array 162. Each of outbound beams 155A-C are directed through a corresponding LC of horizontal array 161 and/or horizontal array 163 via up to four vertically displaced optical paths, as shown. How outbound beams are directed along up to four possible optical paths is described below in regard to beam steering unit 134 and beam polarization and steering unit 137.

Referring back to FIG. 1A, beam steering unit 134 is configured to direct inbound beams 154A-C along two different optical paths, i.e., an upper and a lower path, depending on the polarization state of the beams. As noted above, the polarization state of inbound beams 154A-C is determined by the polarization conditioning performed by beam polarization unit 131. The two optical paths are separated angularly or by a translational offset in the vertical direction. In either case, the vertical offset between the two possible paths for inbound beams 154A-C indicates that inbound beams 154A-C may be directed to either an upper or lower region of beam polarization and steering unit 137. Beam steering unit 134 is also configured to direct outbound beams 155A-C back through beam polarization unit 131. Similar to beam steering unit 114, beam steering unit 134 may be a Wollaston prism or a birefringent crystal. In contrast to beam steering unit 114, beam steering unit 134 is oriented to impart an angular or translational deflection to beams in the vertical direction rather than the horizontal direction. Further, beam steering unit 134 does not have an axis of symmetry in the vertical when the beam steering unit is a Wollaston prism.

Similar to beam polarization unit 131, beam polarization and steering unit 137 includes an LC array 137A containing bistable LCs and a plurality of transparent control electrodes. Beam polarization and steering unit 137 further includes a birefringent crystal 137B (e.g., a YVO$_4$ crystal) and a reflective element 137C (e.g., a mirror). Beam polarization and steering unit 137 is configured to direct each incident beam, i.e., inbound beams 154A-C, along two different parallel optical paths, separated by a vertical offset, depending on the polarization conditioning by LC array 137A. Since each of inbound beams 154A-C may be directed to beam polarization and steering unit 137 along two possible sets of optical paths from beam steering unit 134, i.e., an upper path or lower path, outbound beams 155A-C may be directed from beam polarization and steering unit 137 along any of four vertically displaced optical path sets.

As noted above, WSS 100 is configured for expansion vertically, i.e., one or more WSS's may be positioned directly above or below WSS 100 to form a stack of 1×4 switching devices. The stack may then be packaged together as a single unit. To better protect the alignment and cleanliness of the optical elements that make up each optical switching device, the packaging of the stack may be hermetically sealed. Because the packaging, electronics, and one or more optical components for the stack are shared by multiple optical switching devices contained in the stack, the per-channel cost of the packaging, electronics, and optical components is lower than for an individually packaged and controlled optical switching device.

The two or more WSS's (or other WDM optical switching devices) contained in a packaged stack may be optically and electrically isolated and functionally independent, thereby avoiding optical and electrical crosstalk between the optical switching devices. However, because a number of the optical elements of WSS 100 possess a vertically oriented axis of symmetry, i.e., the axis is perpendicular to the plane traveled by light beams in WSS 100, these optical elements may be extended along the vertical axis to serve as optical elements in multiple optical switching devices contained in the stack. An example of an optical element being extended along a vertical axis of symmetry is described below in conjunction with FIG. 2A. Each optical element that may be shared between optical switching devices substantially reduces the per-channel cost of manufacturing and alignment of the stack. For the configuration of WSS 100 illustrated in FIG. 1A, optical elements that may be shared between multiple WSS's that are packaged in a single vertical stack include optical input port 101, optical output port stack 102, beam steering unit 114, cylindrical lens 116, diffraction grating 117, folding mirrors 113 and 122, focusing lens 123, beam polarization unit 131, beam polarization and steering unit 137, and, if configured as a birefringent crystal, beam steering unit 134.

Figure 2A:
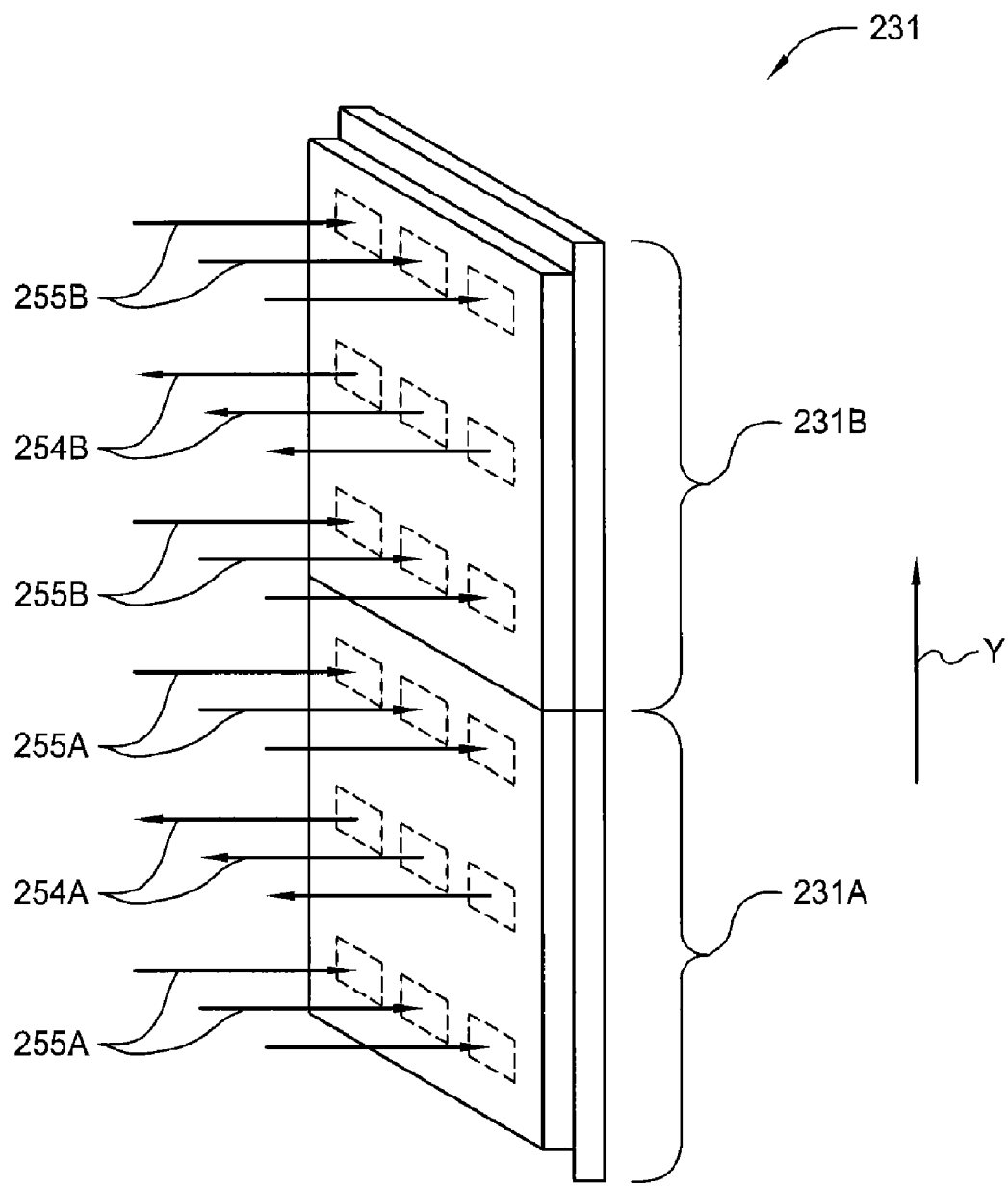
FIG. 2A schematically illustrates a perspective view of an extended beam polarization unit that may act as a beam polarization unit for two optical switching devices contained in a packaged stack according to an embodiment of the invention.

FIG. 2A schematically illustrates a perspective view of an extended beam polarization unit 231 that may act as a beam polarization unit for two optical switching devices contained in a packaged stack according to an embodiment of the invention. Extended beam polarization unit 231 consists of beam polarization units 231A, 231B. In this example, each of beam polarization units 231A, 231B are substantially similar in organization and operation to beam polarization unit 131, described above in conjunction with FIGS. 1A and 1B, except that beam polarization units 231A, 231B are manufactured together as elements of extended beam polarization unit 231. Hence, each of beam polarization units 231A, 231B includes an LC array and transparent electrodes positioned between glass plates and configured to modulate the polarity of inbound and outbound beams. Beam polarization unit 231A modulates inbound beams 254A and outbound beams 255A as part of the wavelength channel switching process for the bottom level WSS of a double-deck WSS 200, which is shown in FIG. 2B and described below. Similarly, beam polarization unit 231B modulates inbound beams 254B and outbound beams 255B as part of the wavelength channel switching process for an upper level WSS of double-deck WSS 200.

The same manufacturing steps are required to make either an individual beam polarization unit, such as beam polarization unit 131, or an extended beam polarization unit, such as extended beam polarization unit 231. For example, the lithographic, deposition, etching, and assembly processes for forming the transparent electrodes and LC pixels of an extended beam polarization unit are identical to those for forming an individual beam polarization unit. The primary difference is that larger substrates are needed to produce an extended beam polarization unit compared to an individual beam polarization unit. Therefore, it is substantially more cost effective to manufacture and align a single extended beam polarization unit that is shared by multiple WSS's in a packaged stack than to manufacture and align an individual polarization unit for each WSS contained in the stack. Similarly, other optical elements of a WSS, such as folding mirrors, diffraction gratings, and cylindrical lenses, may also be extended vertically and shared by multiple WSS's contained in a packaged stack. As with extended beam polarization unit 231, the use of vertically extended cylindrical lenses, vertically extended folding mirrors, etc., substantially reduces the number of optical components to be manufactured and aligned to produce a packaged stack of optical switching devices. In this way, the per-channel cost of such a packaged stack may be further reduced.

Figure 2B:
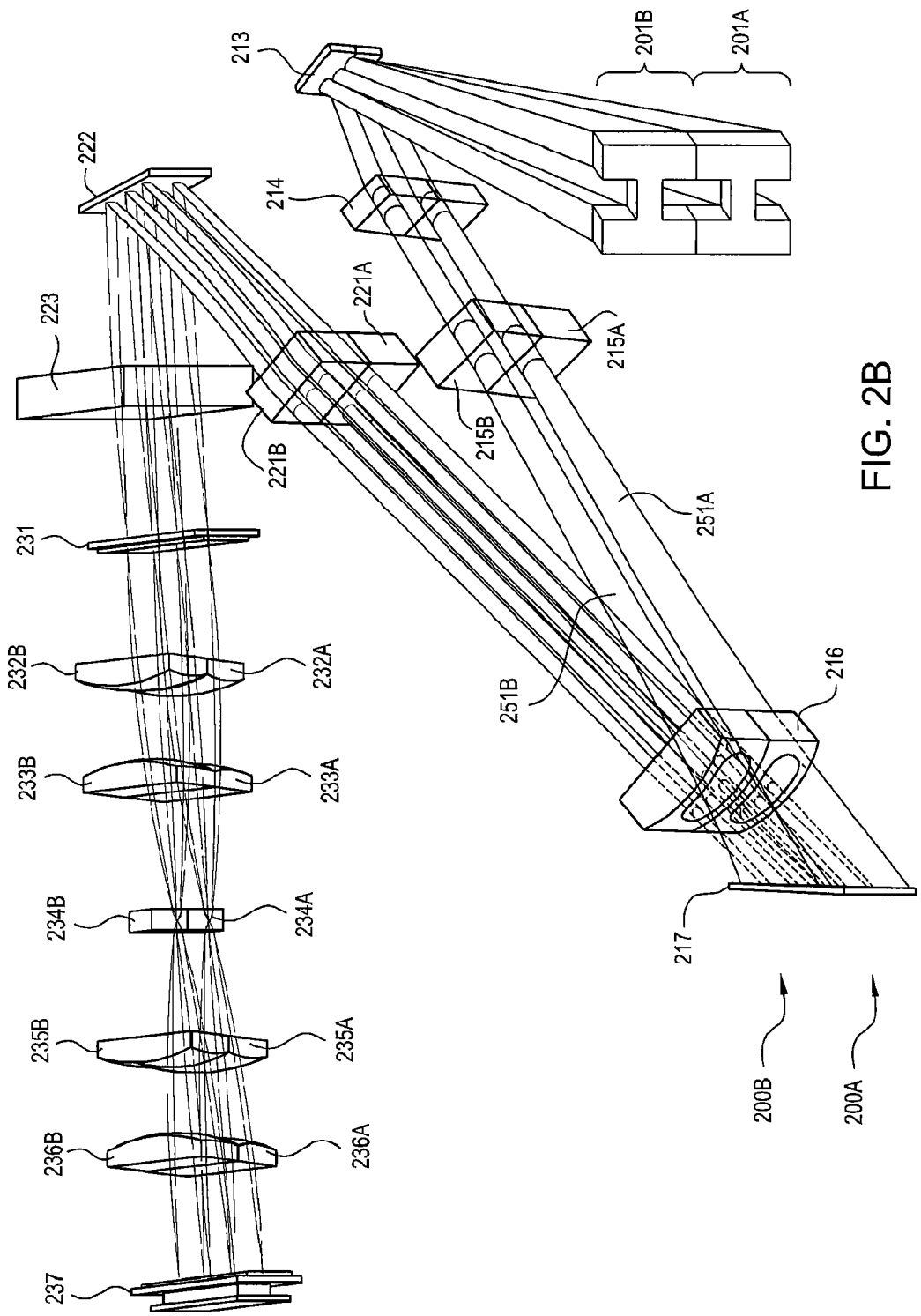
FIG. 2B is a perspective view of a double-deck WSS according to an embodiment of the invention.

FIG. 2B is a perspective view of a double-deck WSS 200 according to an embodiment of the invention. Double-deck WSS 200 includes two functionally independent, 1×4 WSS's, WSS 200A and WSS 200B. WSS 200A and WSS 200B are each substantially similar in organization and operation to WSS 100, described above, except that a number of optical elements are shared between WSS 200A and 200B.

As illustrated in FIG. 2B, WSS 200A includes an input/output port assembly 201A, a cylindrical lens 215A, a cylindrical lens 221A, collimating lenses 232A, 233A, 235A, and 236A, a beam steering unit 234A, and a lower region of the following shared optical elements: folding mirrors 213 222, beam steering unit 214, cylindrical lens 216, diffraction grating 217, focusing lens 223, beam polarization unit 231, and beam polarization and steering unit 237. Similarly, WSS 200B includes an input/output port assembly 201B, a cylindrical lens 215B, a cylindrical lens 221B, collimating lenses 232B, 233B, 235B, and 236A, a beam steering unit 234B, and an upper region of the above named shared optical elements.

In operation, WSS 200A may act as an independent 1×4 WDM WSS, and directs a plurality of light beams 251A along a lower horizontal plane contained in double-deck WSS 200 to perform the wavelength channel switching operation. Likewise, WSS 200B may also act as an independent 1×4 WDM WSS, and directs a plurality light beams 251B along an upper horizontal plane contained in double-deck WSS 200. Hence, double-deck WSS 200 may serve as a 2×8 WSS for a WDM optical signal.

The optical switching devices described in FIGS. 1A and 2B are configured with bidirectional optical elements, i.e., optical components positioned to interact with light beams travelling in two directions. It is noted that WDM optical switching devices that are not configured as optically bidirectional may also benefit from being incorporated into a packaged stack. Embodiments of the invention further contemplate that WDM optical switching devices other than WSS's may be beneficially incorporated into a packaged stack as described herein. Wavelength blockers, such as OADMs, DGEs, and others, may benefit from such a packaged stack configuration since per-channel packaging and electronics costs are reduced compared to individually packaged and controlled optical switching devices. In addition, an OADM or DGE stack may also have reduced component and alignment costs since such devices may include diffraction gratings, cylindrical lenses, mirrors, and beam steering units that may be shared between the switching devices of the stack, further reducing the per-channel cost of the stack.

While the foregoing is directed to embodiments of the present invention, other and further embodiments of the invention may be devised without departing from the basic scope thereof, and the scope thereof is determined by the claims that follow.

What is claimed is:

1. A packaged optical device comprising:
   a first WDM optical device;
   a second WDM optical device; and
   a common housing in which the first and second WDM optical devices are stacked,
   wherein light beams transmitted through the first WDM optical device travel along a first set of optical paths and light beams transmitted through the second WDM optical device travel along a second set of optical paths, and wherein the optical paths in the first set do not intersect the optical paths in the second set and wherein the first WDM optical device and the second WDM optical device share one or more optical elements, including a common beam polarization and steering unit having a liquid crystal array and a birefringent element.

2. The packaged optical device according to claim 1, wherein the first WDM optical device and the second WDM optical device are wavelength selective switches and share a common diffraction grating.

3. The packaged optical device according to claim 1, wherein the shared optical elements include a beam polarization unit.

4. The packaged optical device according to claim 3, wherein the beam polarization unit includes an LC cell.

5. The packaged optical device according to claim 1, wherein each of the first WDM optical device and the second WDM optical device has N input ports and M output ports, and wherein N is any positive integer and M is any positive integer greater than or equal to 2.

6. A packaged optical device comprising:
   a first WDM optical device having N input ports and M output ports;
   a second WDM optical device having N input ports and M output ports; and
   a common housing in which the first and second WDM optical devices are stacked,
   wherein the first WDM optical device and the second WDM optical device share one or more optical elements, including a common beam polarization and steering unit having a liquid crystal array and a birefringent element, and wherein N is any positive integer and M is any positive integer greater than or equal to 2.

7. The packaged optical device according to claim 6, wherein light beams transmitted through the first WDM optical device travel along a first set of optical paths and light beams transmitted through the second WDM optical device travel along a second set of optical paths, and the optical paths in the first set do not intersect the optical paths in the second set.

8. The packaged optical device according to claim 7, wherein the first WDM optical device and the second WDM optical device are wavelength selective switches and share a common diffraction grating.

9. The packaged optical device according to claim 7, wherein the shared optical elements include a beam polarization unit.

10. The packaged optical device according to claim 9, wherein the beam polarization unit includes an LC cell.

11. The packaged optical device according to claim 6, wherein the first and second WDM optical devices are optical communication devices of the same type.

12. The packaged optical device according to claim 11, wherein the first and second WDM optical devices comprise wavelength blockers.

13. A wavelength selective switch comprising:
a first set of input and output ports;
a second set of input and output ports;
a light dispersing element for dispersing a first input light beam received through the first set of input and output ports into a first set of multiple wavelength components and a second input light beam received through the second set of input and output ports into a second set of multiple wavelength components;
a first optical switch for receiving the first set of multiple wavelength components and directing them to one of multiple directions; and
a second optical switch for receiving the second set of multiple wavelength components and directing them to one of multiple directions,
wherein the first and second sets of input and output ports are stacked within a common housing and the first and second optical switches are stacked within the common housing and the first and second optical switches share one or more optical elements, including a common beam polarization and steering unit having a liquid crystal array and a birefringent element.

14. The wavelength selective switch according to claim 13, wherein the light dispersing element is configured to receive the first set of multiple wavelength components that passed through the optical switch and combine them into a single output light beam and to receive the second set of multiple wavelength components that passed through the optical switch and combine them into a single output light beam.

15. The wavelength selective switch according to claim 13, wherein each of the first optical switch and the second optical switch comprises a beam polarization unit and a beam steering unit that switches the optical path of the multiple wavelength components based on their polarization state.

16. The wavelength selective switch according to claim 15, wherein the beam steering unit comprises one of a birefringent crystal and a Wollaston prism.

17. The wavelength selective switch according to claim 13, wherein light beams transmitted through the first optical switch travel along a first set of optical paths and light beams transmitted through the second optical switch travel along a second set of optical paths, and the optical paths in the first set do not intersect the optical paths in the second set.

18. The wavelength selective switch according to claim 13, wherein the first set of input and output ports includes N input ports and M output ports and the second set of input and output ports includes N input ports and M output ports, and wherein N is any positive integer and M is any positive integer greater than or equal to 2.

19. The wavelength selective switch according to claim 13, wherein the first and second sets of input and output ports are vertically stacked within the common housing and the first and second optical switches are vertically stacked within the common housing.

* * * * *